United States Patent [19]

Tseng et al.

[11] Patent Number: 5,650,864
[45] Date of Patent: Jul. 22, 1997

[54] FULL COLOR SINGLE-SENSOR-ARRAY CONTACT IMAGE SENSOR (CIS) USING ADVANCED SIGNAL PROCESSING TECHNIQUES

[75] Inventors: Hsin-Fu Tseng, Los Altos; Weng-Lyang Wang, Saratoga, both of Calif.

[73] Assignee: Scanvision, San Jose, Calif.

[21] Appl. No.: 629,395

[22] Filed: Apr. 8, 1996

[51] Int. Cl.$^6$ .................................................. H04N 1/04
[52] U.S. Cl. .................... 358/475; 358/482; 348/272; 348/269; 348/263; 348/243
[58] Field of Search ........................... 358/471, 472, 358/473, 474, 479, 482, 475; 348/222, 243, 262, 263, 268, 269, 272

[56] References Cited

U.S. PATENT DOCUMENTS 4,985,758  1/1991  Hashimoto ................. 358/44
5,097,339  3/1992  Ishida et al. .
5,153,929  10/1992 Itagaki ........................ 382/65
5,438,364  8/1995  Maeshima et al. ............ 348/223

*Primary Examiner*—Thomas D. Lee
*Assistant Examiner*—Jerome Grant, II
*Attorney, Agent, or Firm*—The Kline Law Firm

[57] ABSTRACT

A color-reproducing contact image sensing (CORCIS) system that eliminates the use of multiple arrays of photodetectors with separate color filters and which permits the use of any of various signal-processing improvements such as voltage pickoff, transducer gain and correlated double sample and hold processing. The device operates by sequentially illuminating the colored object to be reproduced by primary color illumination means, with each illumination transferring in parallel the appropriate color response to a readout register for sequential readout. The sample and hold, and the parallel transfer operation, allow the CORCIS system to be able to read out signal while the detector array is integrating the next color signal, thus improving the sensitivity.

9 Claims, 18 Drawing Sheets

FULL COLOR SINGLE-SENSOR-ARRAY CONTACT IMAGE SENSOR (CIS) USING ADVANCED SIGNAL PROCESSING TECHNIQUES

FIELD OF THE INVENTION

The present invention relates generally to image-sensing systems and arrays to scan documents, and more particularly to a system for obtaining full-color output by using sequential primary-color illumination of the object scanned and using a single full-width detector array of linearly butted contact image sensors (CIS). This arrangement permits the simplicity of MOS-technology single-array scanning while at the same time permitting high speed, high dynamic range, and high sensitivity through use of parallel signal transfer and correlated double sampling (CDS) or other advanced signal-processing techniques. Specifically, it avoids the current complexity of three separate color-filtered detector arrays.

BACKGROUND OF THE INVENTION

The technology required to scan documents has existed for approximately twenty years. Means to provide full-color output has also existed in the form of providing three separate color-filtered detector arrays which deliver three color-coded outputs. Historically, linear image sensor arrays, in the form of charge-coupled devices (CCD's) or self-scanned photo-diode arrays (or MOS arrays), have been used to accomplish the scanning. The early prior art scanning devices required at least three essential elements to capture the image of a grey-scale subject document: (1) a light source to illuminate the document, (2) an image sensing means, and (3) a lens system to focus the image of the document on the image sensor. The prior art provision of full color output, as opposed to a grey-scale output, required a fourth essential element or treatment, that of separating the image into three separate color-filtered images, each image impinging on a separate detector array, and thus essentially tripling the complexity of the device. The background treatment below applies generally to gray-level imaging; the addition of color imaging requires separate processing means of one or another form in addition to the basic scanning and imaging.

A typical configuration for a scanning device (a lens reduction image sensor system) is illustrated in FIG. 1. An original document 1 is illuminated by a light source 2. Since a CCD image sensor 3 is typically approximately one inch long, an optical lens 4 is required to reduce the image of the text on the document 1 so that a full-width image can be received in the CCD image sensor 3.

In addition, to obtain the necessary reduction, an optical distance of 10 to 30 cm is required between the CCD image sensor 3 and the document 1. This optical separation distance necessitates a rather bulky assembly for the overall scanning device, and for this reason, some prior art devices use sophisticated (hence expensive and difficult to manufacture) folded optical schemes to reduce the total physical size of the assembly.

An improvement on the system shown in FIG. 1 is shown in FIG. 2, which depicts a contact image sensor (CIS) system. In this device the reducing optical system is replaced with a full-width rod-lens system 5. This system allows one-to-one scanning of the document because the rod lens 5 and a hybrid image sensor chip 6 are of the same width as (or greater width than) the document to be scanned. This arrangement allows the distance between the image sensor and the document being scanned to be reduced to approximately 2 cm.

A cross section of such an improved prior art imaging system utilizing a hybrid image sensor chip 6 is shown in FIG. 3, which depicts the arrangement of the components within a housing with a cover glass 7 to receive documents. FIG. 4 is a block diagram of such an imaging system, with FIG. 5 showing some detail of the construction of a prior art hybrid image sensor array 6. In this hybrid package, a plurality of individual sensor chips 61 are butted end-to-end on a single substrate. The number of individual sensor chips chosen is dependent upon the desired width of scanning. The hybrid sensor array 6 also contains signal processing means to serially activate the individual chips and to process the outputs.

A block diagram illustrating the function of a typical prior art individual sensor chip 61 is shown in FIG. 6, with detail of the sensor elements shown in FIG. 7. (The structure and function of this chip is described in detail in U.S. Pat. No. 5,299,013, issued Mar. 39, 1994.) With reference to FIGS. 5–7, the individual sensor chip 61 comprises an array of photodetectors, an array of multiplexing switches, a dummy cell, a shift register, a built-in buffer, and a chip selector. In operation, the sensor chip 6 is triggered by a start pulse to the first-in-sequence individual sensor chip 61 which serially activates the photodetectors on the first individual sensor chip 61. After the signal from the last photodetector element of the first individual sensor chip 61 is read, an end-of-scan pulse is generated so that the next sensor chip in sequence is triggered.

The individual sensor chips 61 of most prior art devices utilize npn phototransistors as the sensing elements, as illustrated in the circuit diagram shown in FIG. 7. The npn phototransistors provide some gain for the detected light signal, and thus serve to increase the photosensitivity of the device. However, phototransistors are subject to several inherent shortcomings. The gain provided is not linear, being proportionately higher at low signal strengths and lower at higher signal strengths. This nonlinearity can be a significant problem in certain applications, such as those requiring uniform differentiation of gray scales, or the balancing of colors in color-scanning applications.

Further, the gain from the phototransistors is not uniform from transistor to transistor within a chip or within the array. The base of an npn phototransistor is formed by ion implantation. There is typically a ±5% non-uniformity across a wafer subjected to ion implantation. This non-uniformity results in a current gain variation of ±30% across the wafer. The non-uniformity of the gain yields a non-uniformity of the photoresponse of the same magnitude.

A still further drawback to a scanner with phototransistors is the problem of low-light-level thresholding due to emitter offset. Before the output current can flow through the phototransistor, the current must first overcome the emitter-junction forward-bias voltage. This threshold effect results in light signals of low intensity not being sensed by the phototransistor. This problem is most significant in color scanning applications.

Another shortcoming in sensor chips utilizing npn phototransistors is a reduction in sensitivity for high-density arrays. A phototransistor's sensitivity is proportional to its sensing area. As array density increases, the sensing area of an individual phototransistor is decreased drastically, and thus the array sensitivity is likewise decreased.

A final shortcoming in prior art devices is that they require the use of the BICMOS process for manufacturing due to the utilization of the phototransistor sensing elements. This process is more complicated than the standard CMOS process.

A substantial improvement in contact image scanners over those using phototransistors is described in co-pending patent application Ser. No. 08/532,926, filed Sep. 22, 1995 by Hsin-Fu Tseng and Weng-Lyang Wang, titled "CONTACT IMAGE SENSOR UTILIZING VOLTAGE PICK-OFF". A further improvement is described in co-pending patent application Ser. No. 08/595,330, filed on Feb. 1, 1996 by Hsin-Fu Tseng and Weng-Lyang Wang, titled "CONTACT IMAGE SENSOR (CIS) USING VOLTAGE PICK-OFF AND CORRELATED DOUBLE SAMPLING (CDS). Those applications are hereby incorporated by reference in their entirety.

In brief, the devices described in the above referenced co-pending applications comprise a plurality of sensing elements, control and drive clocks, digital scanning shift registers, and various signal-enhancing processing means so that noise or offset in the signal can be cancelled by differentially combining signal plus background reference with background reference only. One example is illustrated by the block diagram of FIG. 8, wherein the signals from dummy sensors $d_1, d_2, \ldots d_n$, are individually subtracted from active signals from sensors $S_1, S_2, \ldots S_n$, to give an output largely free from noise and offset.

One major advantage of those co-pending disclosed improvements is that the scanners detect voltage levels proportional to the reflected light, as opposed to current generated in detector elements. These stored voltage signals may then be processed to reduce noise and offset by means such as correlated double sampling (CDS), as illustrated by the block diagram of FIG. 9 and by the single-pixel circuit detail of FIG. 10.

Another advantage of the co-pending disclosed improvements is that they eliminate the use of phototransistors in the CIS sensor chip, and thus permit standard CMOS processing. A still further advantage of those co-pending disclosed improvements is that the sensitivity of the sensing elements is independent of detector size, and as a result, very high density CIS sensor chip arrays with very high sensitivity and with noise-reduction processing can be realized.

COLOR ADAPTATION

Any of the described contact image sensors can be adapted for full color output by directing separate color-filtered images to three appropriate detector/signal-processor combinations, but only at an approximately three-fold increase in complexity over that required for gray-scale imaging. Thus, ordinarily, and in accordance with the prior art, a colored object to be scanned is illuminated by white light, i.e., by light containing all colors. The returned light, from the object, with portions colored according to the color selectivity of the various portions of the object, is directed to three separate detector arrays. Each detector array has an appropriate primary color (e.g. red, green, or blue) filter interposed to select the light at or near those primary colors as returned from the object.

The outputs from those three arrays become the output color signals from the scanner. Such an arrangement is illustrated by the block diagram of FIG. 11. In that diagram, the three sensor arrays are indicated by the rows labeled R, G, and B, indicating the three-fold complexity increase required to obtain the desired color output. It is the goal of the present invention to reduce that increase in complexity without losing the previously described advantages of standard CMOS technology, high density, high sensitivity, voltage pick-off, and correlated double sample and hold signal processing.

Color selectivity can be accomplished, as described above, by providing "white" illumination and selecting, by filtering, the colored returns. Color selectivity can also be accomplished by allowing the object itself to provide the color filtering, that is, to illuminate the object sequentially by each of three primary colors with each portion of the object returning light only for its appropriate color. In this case, there must be full output from the array for one color before the next is implemented, which means that the color scans are time multiplexed instead of position multiplexed. It then becomes obvious that the object to be scanned should be illumined with one color for an appropriate integration period, with the detector array's pixel signals then transferred in parallel into a readout register; the object is then illumined by the next color and during that integration period the prior color's pixel values are read out of the readout register, and so on. Thus, even though the color patterns are time multiplexed, there is virtually no loss in efficiency of the system beyond that of the necessity of three output sequences.

In a typical prior art color scanner, with three separate detectors, each individual pixel's output appears in time sequence. New integration of illumination for each pixel begins following readout, so that the integration time is the time until that pixel is next accessed, with successive integration times for successive pixels being overlapped. This prior art sensor array with overlapped integration times is not suitable for color reproduction using switching color light sources. This is due to the fact that with this type of sensor array, for each pixel to have equal integration time after switching of the color light source, the readout of the pixel signal has to stop while the sensor chips are integrating the signal from a given color of light. The light source therefore must be turned off while the integrated light signal is being read out, resulting in a longer scanning time or a lower photoresponse sensitivity.

OBJECTS, SUMMARY, AND ADVANTAGES OF THE PRESENT INVENTION

The co-pending applications cited above allow the construction of contact image sensors (CIS's) which use a standard CMOS process for manufacture, and which provide substantial improvement in the areas of sensitivity and uniformity. Further improvements provided are voltage pick-off, capacitance reduction, and advanced signal-processing capability to further enhance noise reduction and sensitivity. However, neither the prior art nor the co-pending applications have disclosed means for simplification in the method of producing color scanners.

It is an object of the present invention to provide a COlor Reproducing Contact Image Sensor (CORCIS) having improved performance, but which can be used for color applications without requiring the complexity of three separate detector arrays. Instead of requiring color-filtered imaging on three separate arrays, the present disclosure permits sequential color-selected illumination of the object scanned, with sequential color-coded output from a single detector array, all with the signal-processing advantages described above and the simplicity of a single detector-processor combination.

In summary, the present invention is a COlor Reproducing Contact Image Sensor (CORCIS) system which permits the advantages of single-array color reproduction while maintaining the advantages of standard CMOS technology, voltage pick-off, charge-to-voltage conversion gain, and signal-processing gain through some form of correlated double sampling. The device comprises a plurality of sensing elements, each with a charge-to-voltage conversion element, and each with means to sample the signal level and also to sample the reset or no-signal level in such a way that the differences between those two signals become the desired outputs Furthermore, timing and illumination are such that coordinated signal output occurs sequentially for each of three primary colors. That is, the three sequential color outputs are obtained from a single array in a sensitive, uniform, and noise-free manner through proper illumination and signal processing. Each color's signal data elements are transferred in parallel to a readout register. The readout register then outputs one set of color data while the next color's data is being accumulated at the detector array. The device includes control and drive clocks, digital scanning shift registers, and differential amplifiers to complement correlated double sampling processors, which may take any of the previously disclosed forms.

Alternatively, instead of providing rapid-response light sources, such as may be obtained from light-emitting diodes (LED's), it is possible to obtain the sequential color illumination by use of a white-light source and sequential prismatic selection.

A primary advantage of the present invention is that a single detector array suffices for three primary-color outputs as opposed to the prior requirement of three separate detector arrays. Parallel transfer to a readout register permits uniform simultaneous integration times for all pixels, with readout of one set of color data occurring while data for the next color in the scan pattern is integrating in the array.

Another advantage of the present invention is that it eliminates the use of phototransistors in the CIS sensor chip.

Another advantage of the present invention is that the sensitivity of the sensing elements is independent of detector size, and as a result, very high density CIS sensor chip arrays with very high sensitivity can be realized.

Another advantage of the present invention is that voltage gain can be implemented, either by a capacitance reduction in the charge-to-voltage converter, or by a resettable transducer gain stage.

Another advantage of the present invention is that it allows the use of correlated double sampling techniques to improve uniformity and signal-to-noise ratio.

These and other objects and advantages of the present invention will become apparent to those skilled in the art in view of the best presently known mode of carrying out the invention as describe herein and as illustrated in the drawings.

BEST MODE OF CARRYING OUT THE INVENTION

Figure 1:
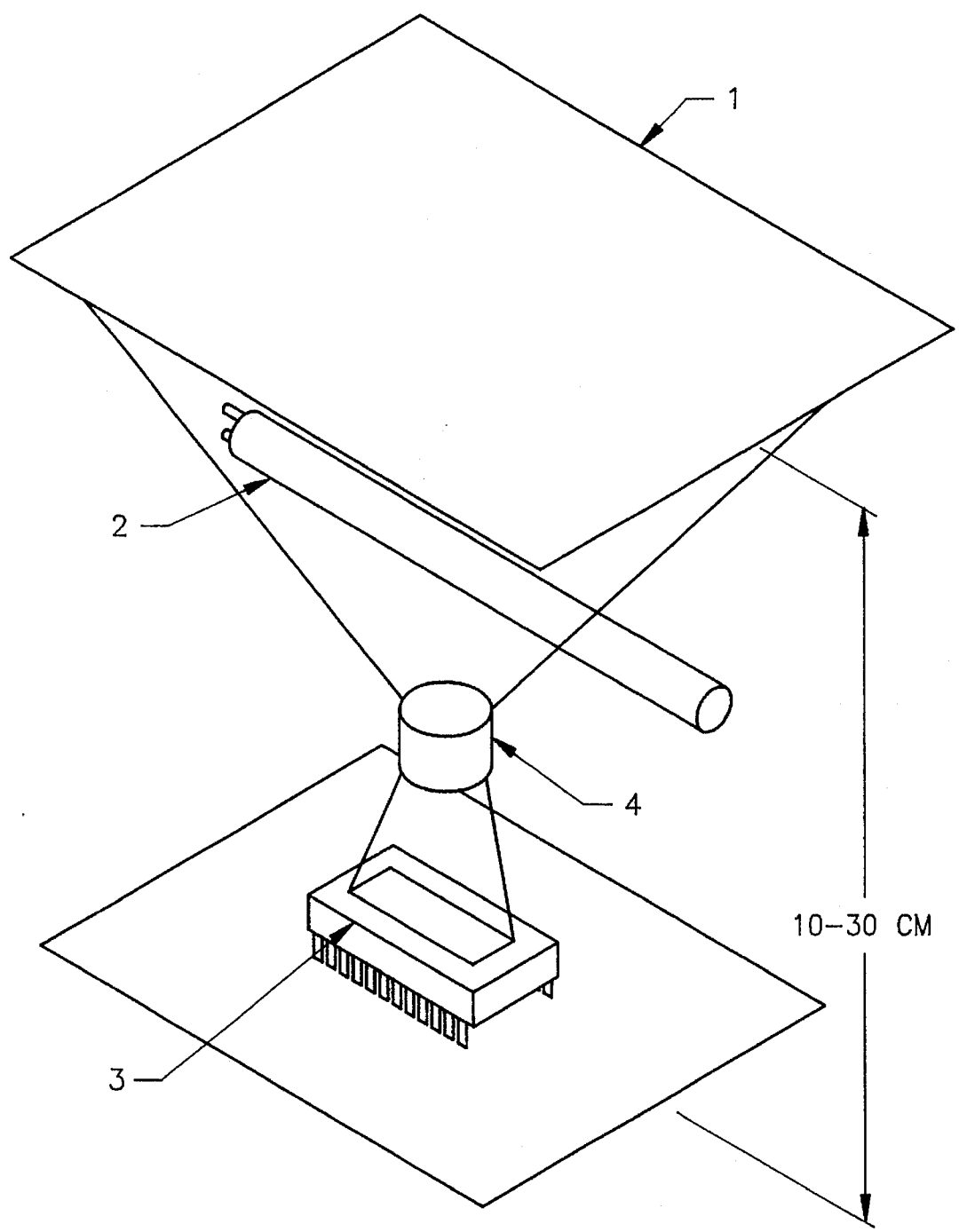
FIG. 1 is a schematic diagram of a prior art CCD scanning device which uses optical size conversion.
Figure 2:
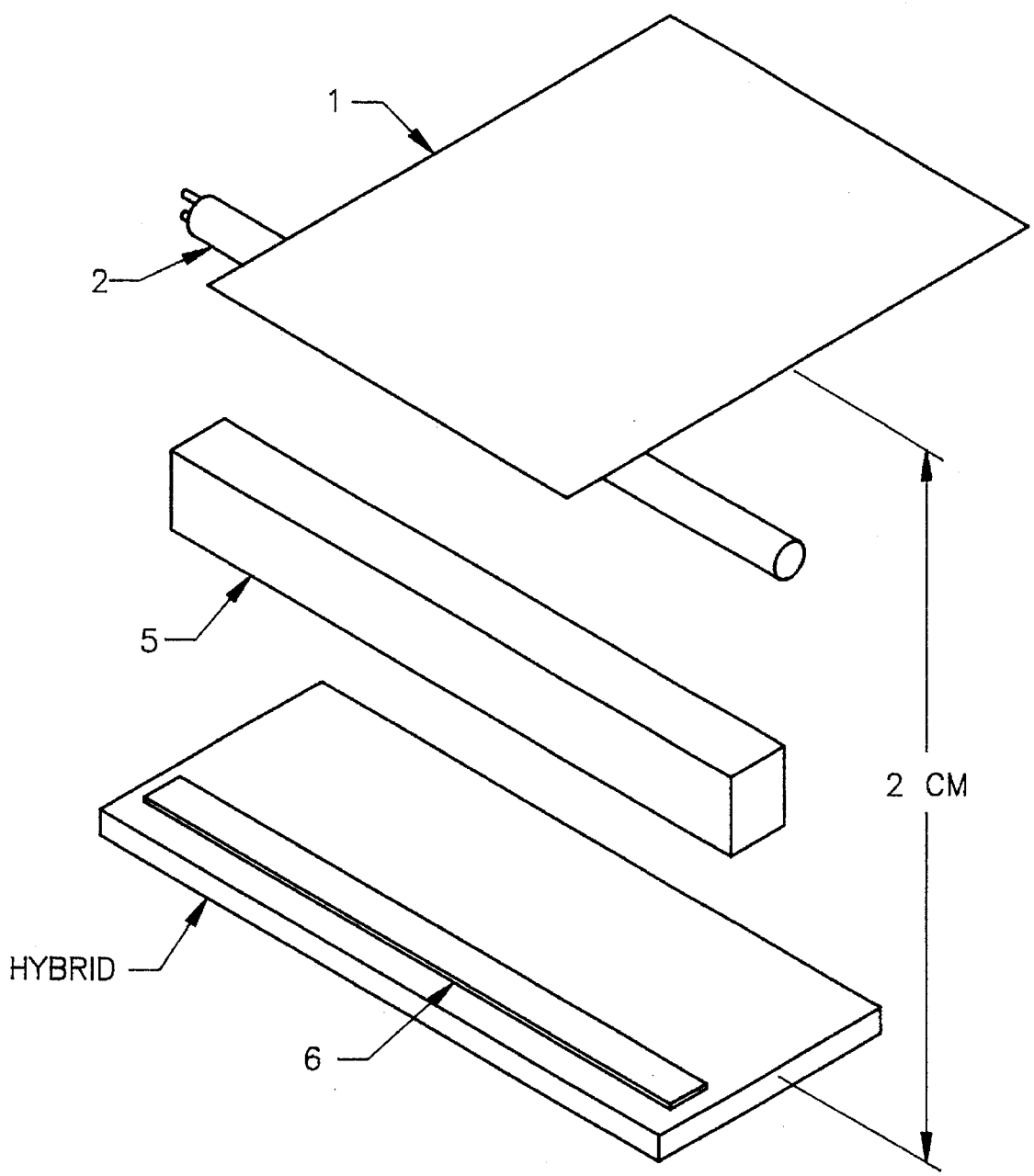
FIG. 2 is a schematic diagram of a more-current prior art full-width scanning device, a contact image sensor (CIS).
Figure 3:
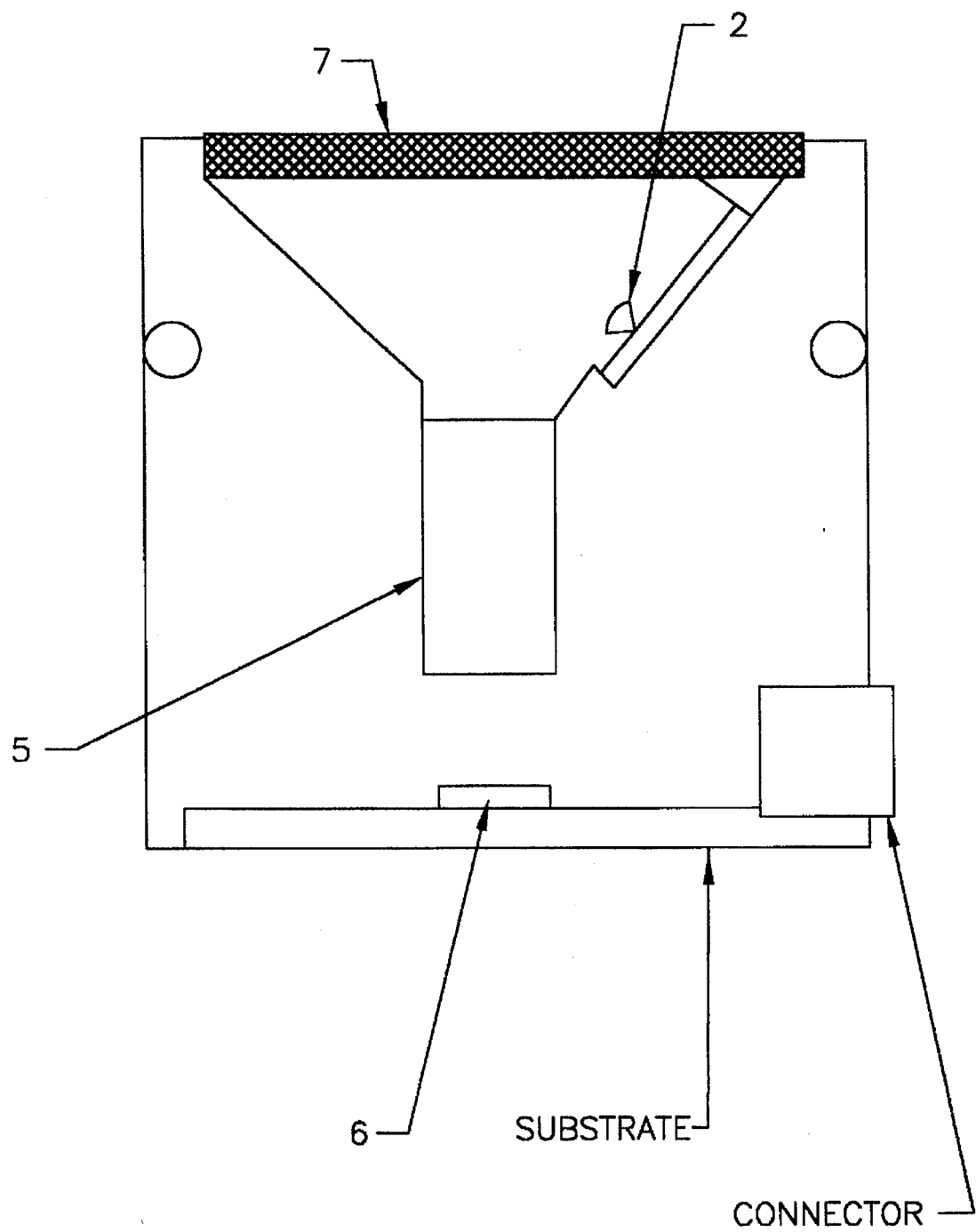
FIG. 3 is a cross section of a more-current prior art CIS scanning device such as that shown in FIG. 2.
Figure 4:
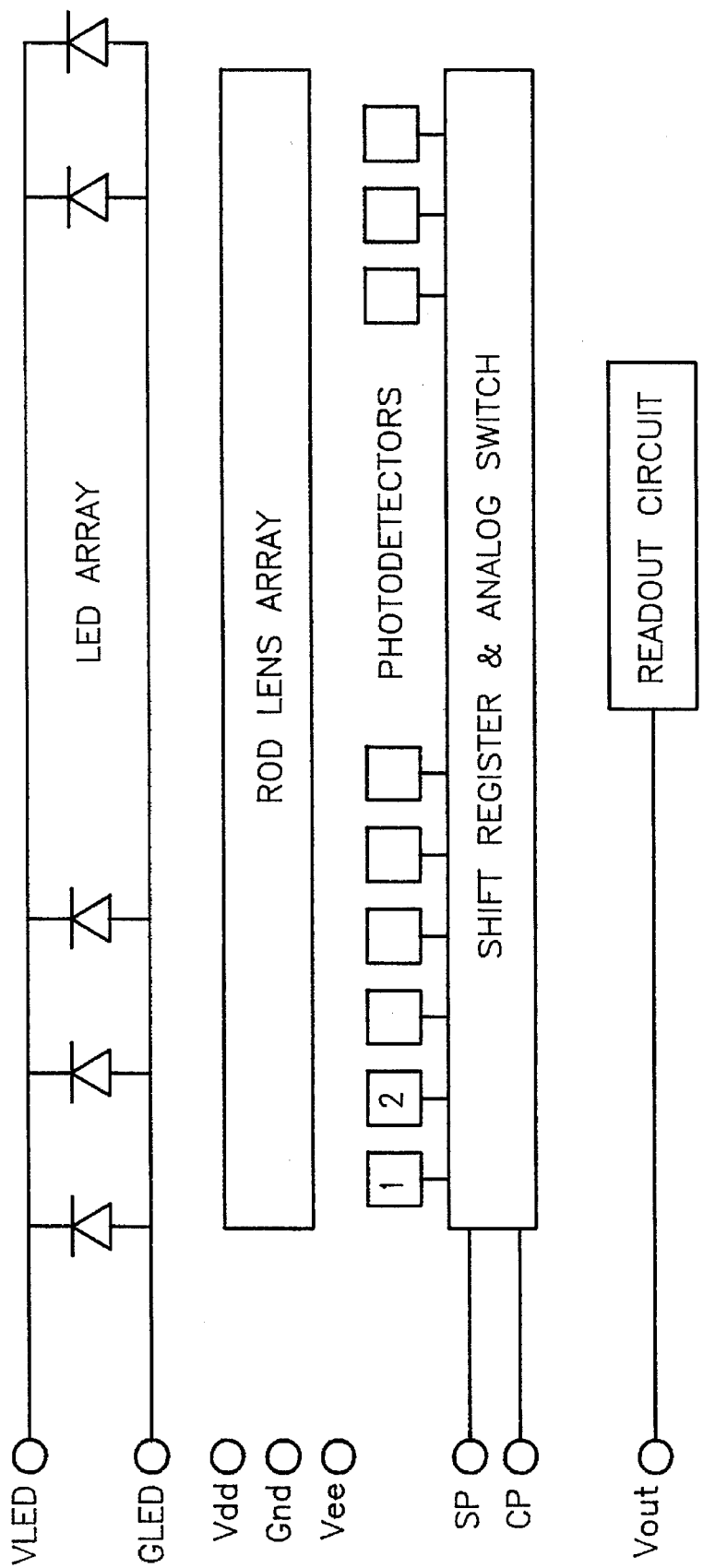
FIG. 4 is a block diagram of a prior art CIS scanning device, such as that shown in FIG. 2.
Figure 10:
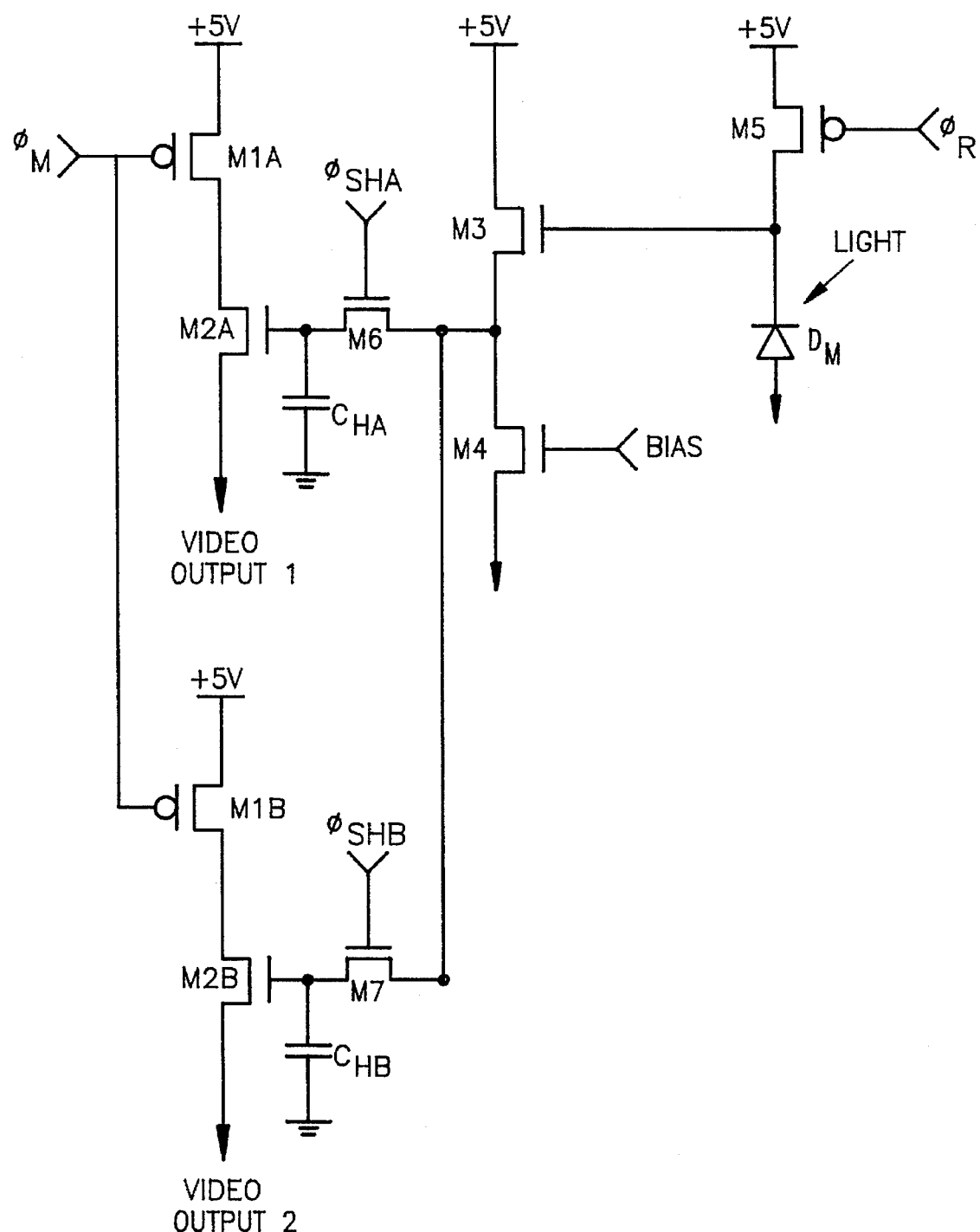
FIG. 10 shows a single-pixel sub-circuit illustrative of correlated double sampling.
Figure 11:
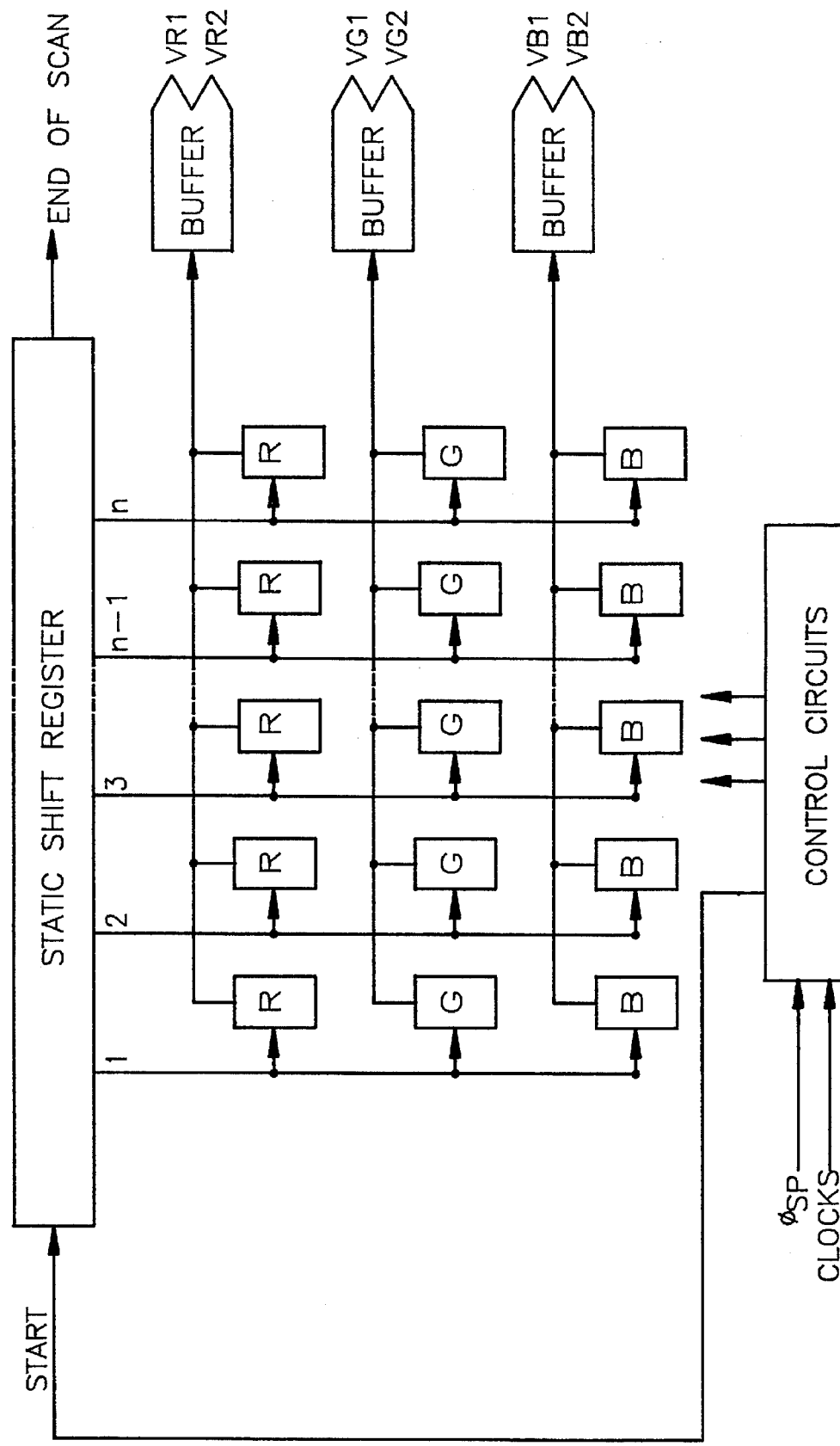
FIG. 11 shows an arrangement for prior art color reproduction wherein three separate detector arrays are used, each with an appropriate color filter.
Figure 12:
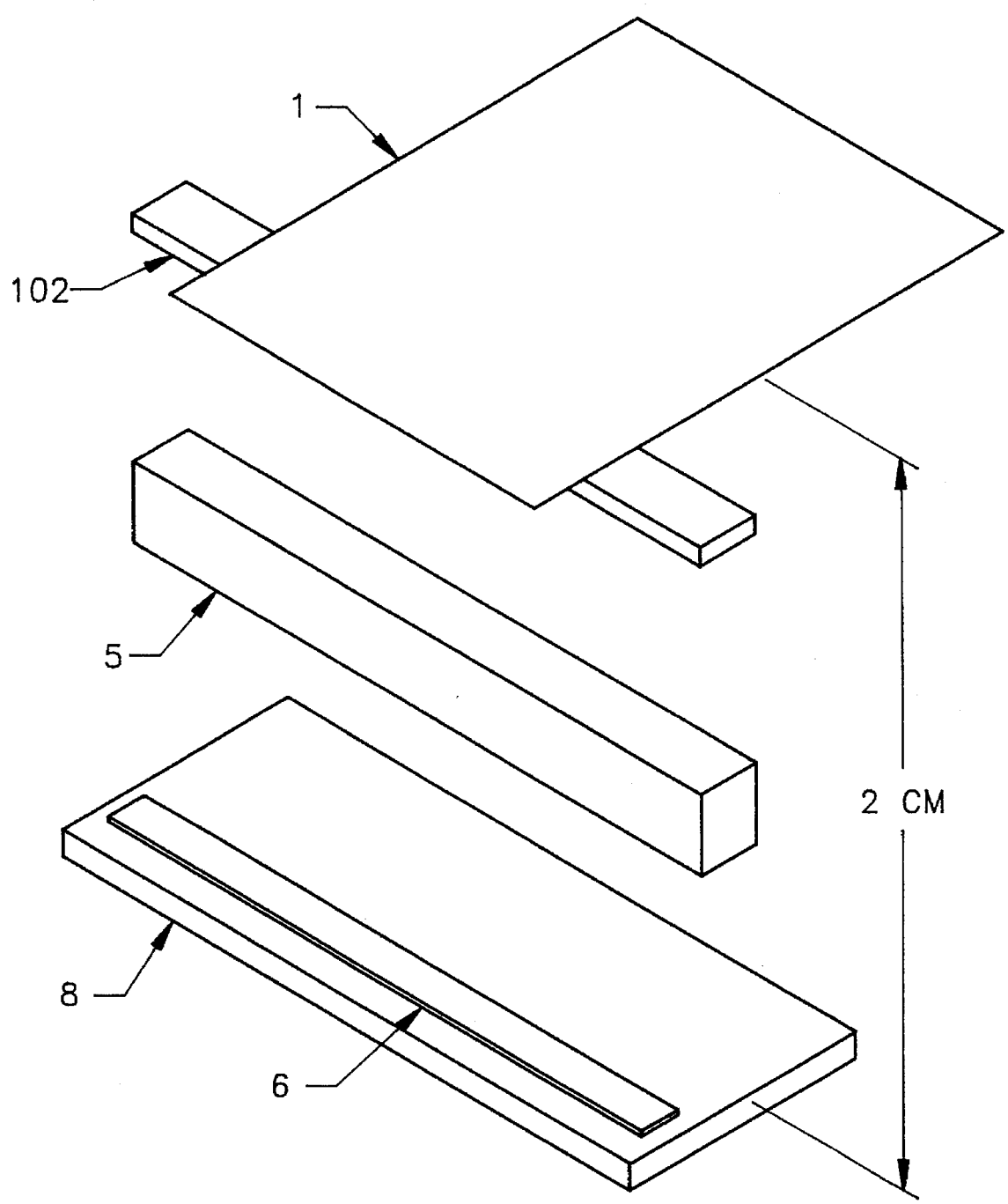
FIG. 12 shows the physical arrangements for the single-array color-reproducing contact image sensor (CORCIS).
Figure 13:
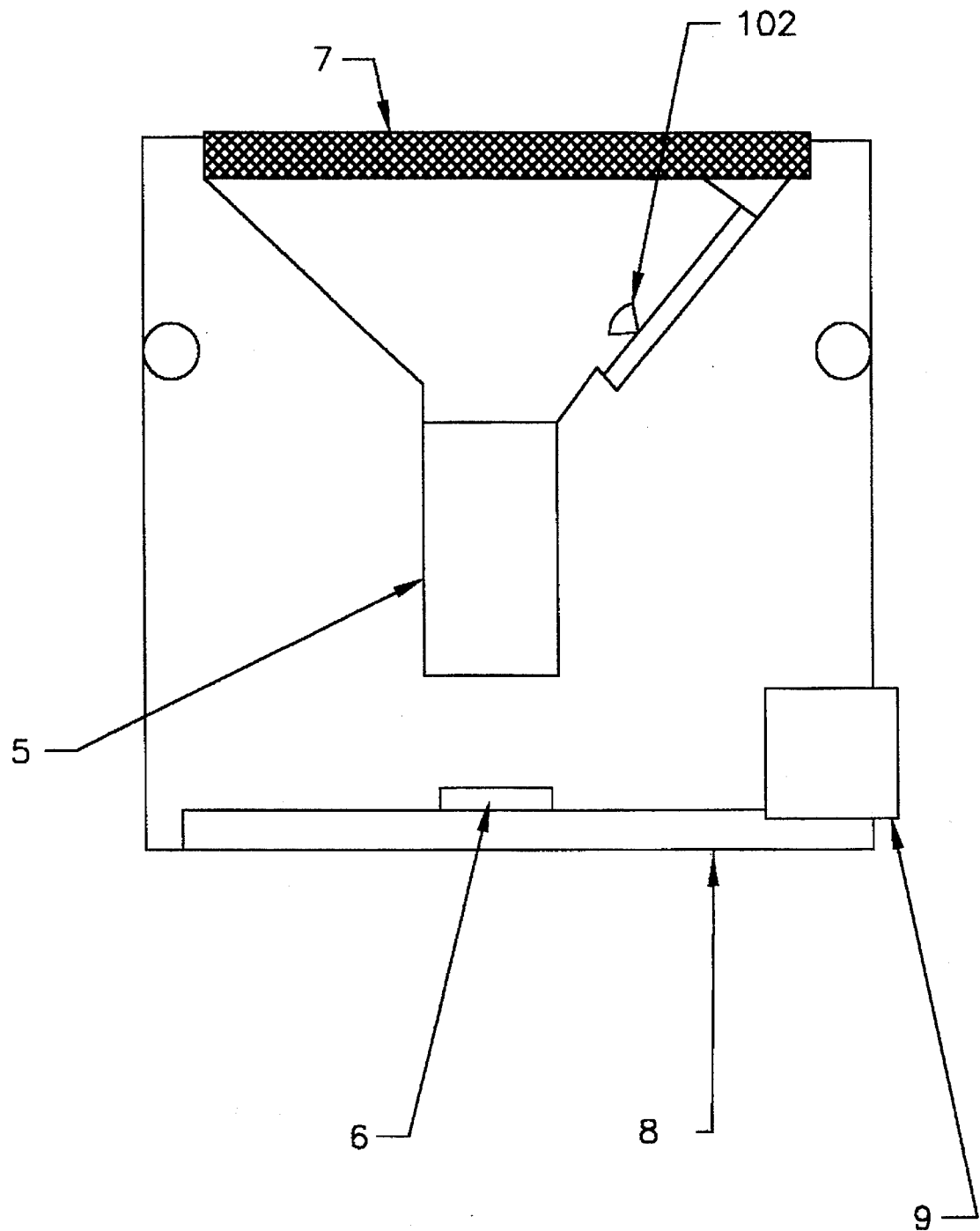
FIG. 13 is a cross-section of the arrangement for the single-array color-reproducing contact image sensor (CORCIS).
Figure 14:
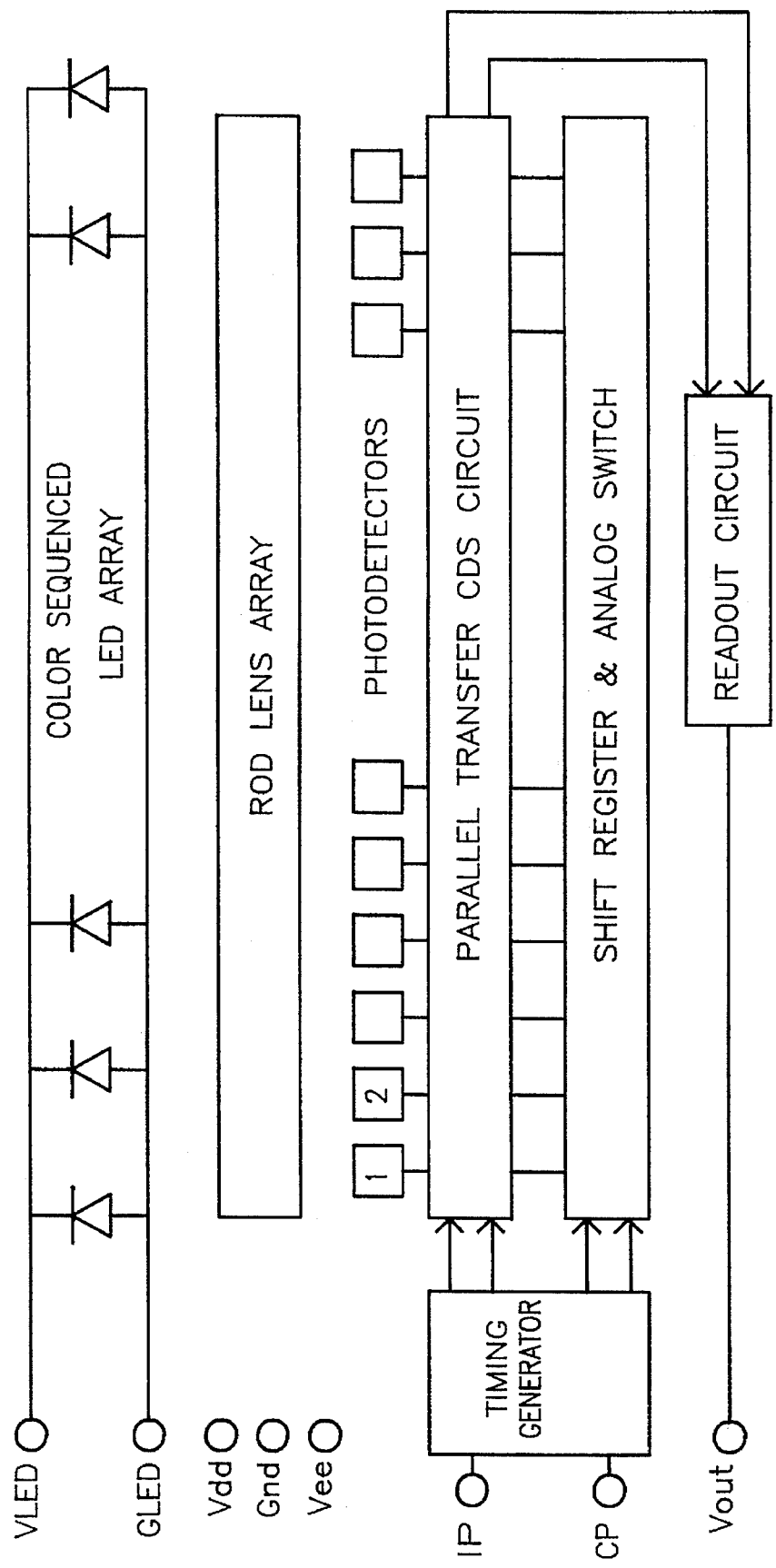
FIG. 14 is a block diagram of the single-array CORCIS module of FIG. 12.
Figure 15:
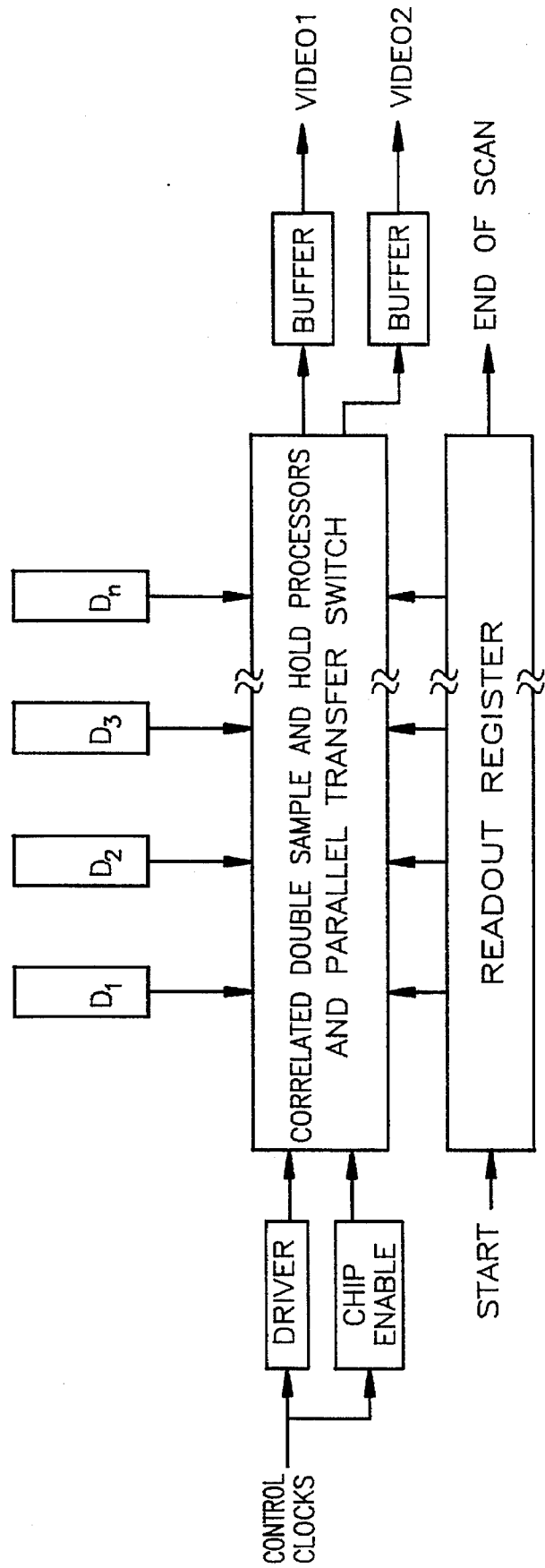
FIG. 15 is a block diagram in more detail for the individual sensor chip in FIG. 14.
Figure 16:
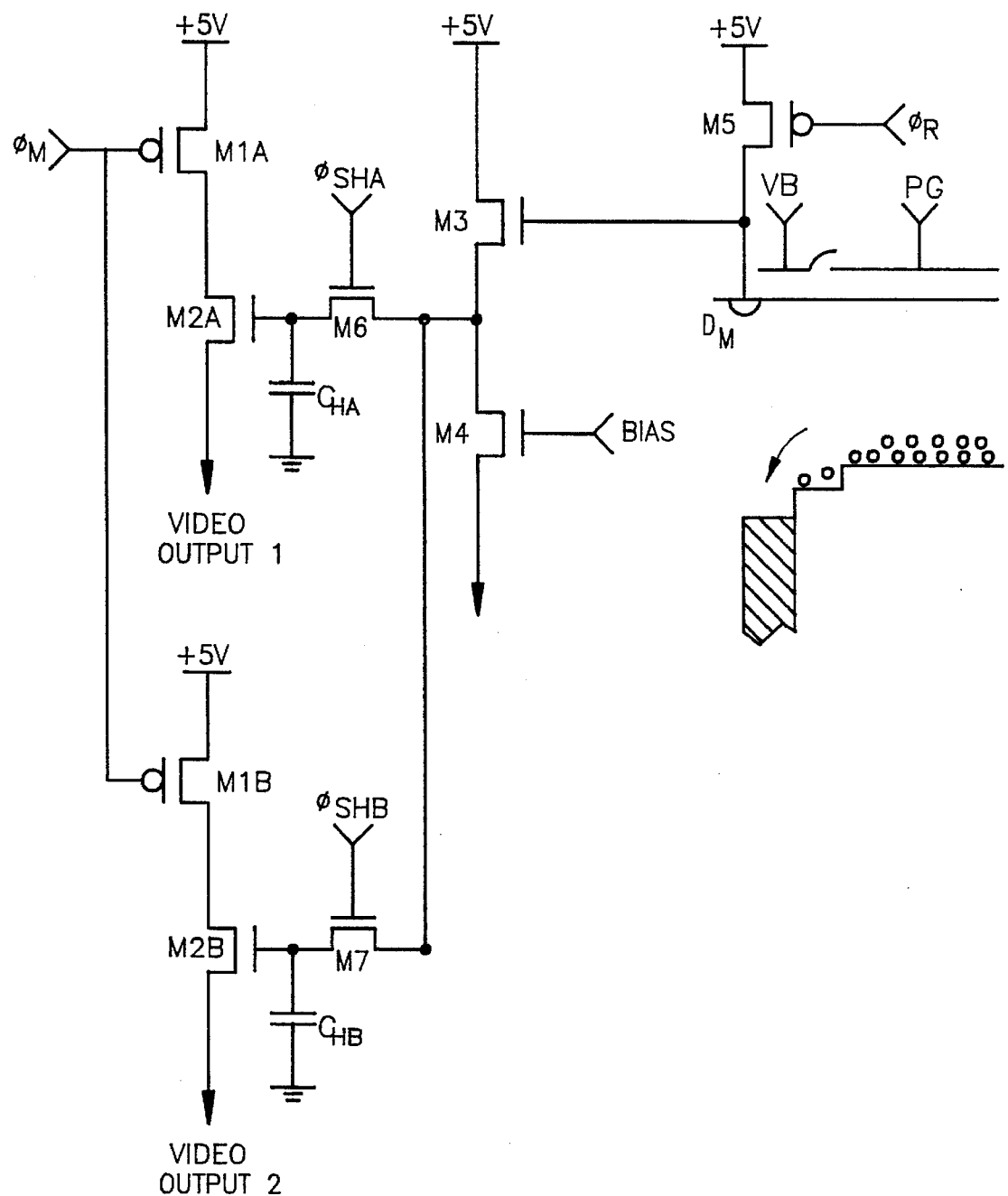
FIG. 16 depicts an alternative embodiment for the individual sensor chip in the CORCIS system, showing a method for reducing the effective capacitance of the sensor, thus increasing its voltage sensitivity.
Figure 17:
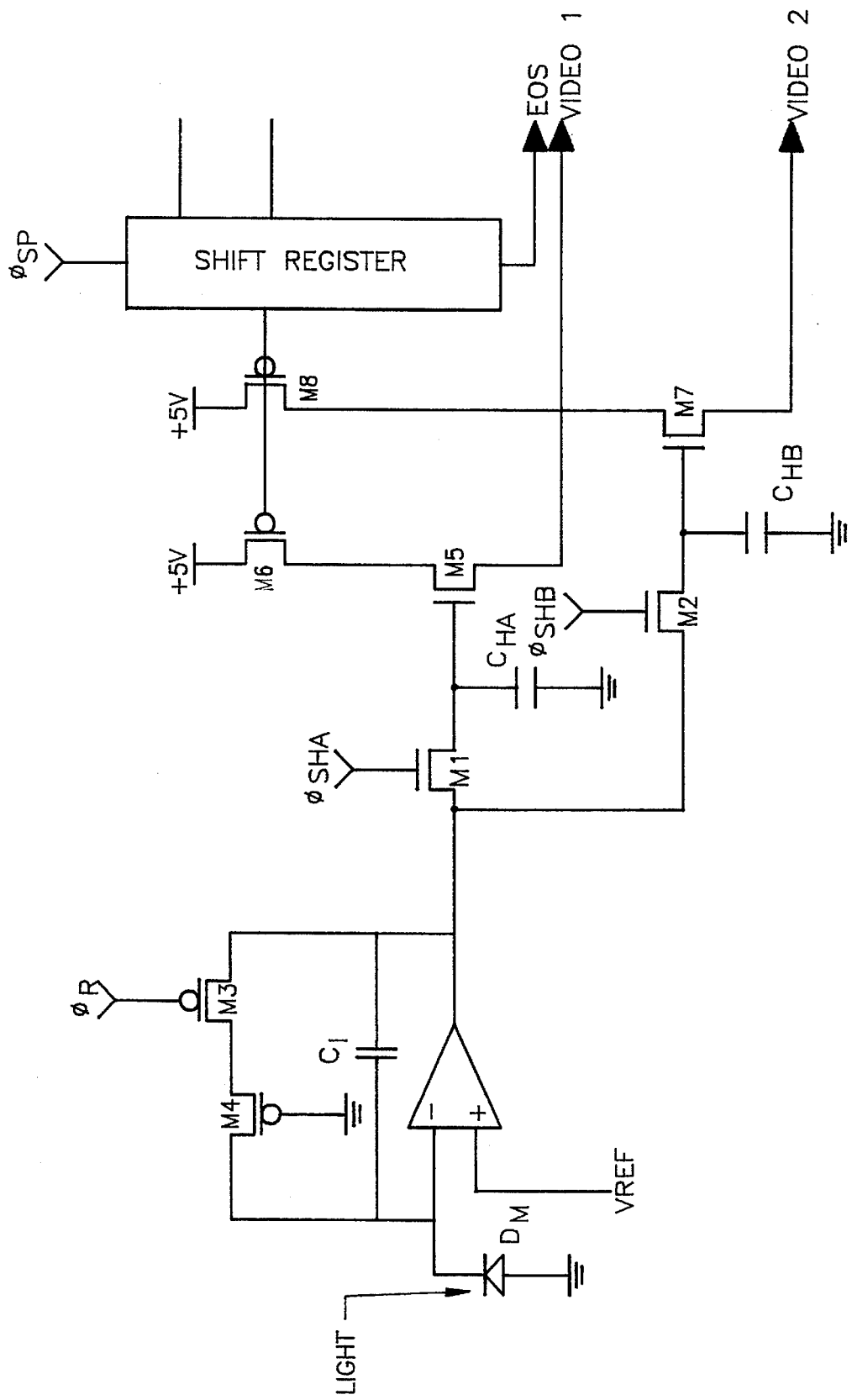
FIG. 17 depicts another alternative embodiment for the individual sensor chip in the CORCIS system, with a resettable charge-transfer gain stage to improve sensitivity and to function in a manner similar to correlated double sample and hold processing.

This specification will refer first to FIG. 12, which shows the physical arrangement of the COlor Reproducing Contact Image Sensor (CORCIS) of the present invention. These arrangements are similar to those of FIGS. 2 and 3, except for the illumination sources, which become time-controlled sources, typically LED's, of the desired primary colors. FIG. 12 depicts the typical scanning layout including a rod lens 5 that focuses light onto the MOS sensor chip 6 on the substrate 8. The light source 102 will typically be an LED. FIG. 13 is a cross sectional view of a scanning device. FIG. 14 is a more detailed diagram of the structure of the device. The CORCIS circuit comprises chiefly a plurality of sensing elements, denoted throughout the drawings as $D_M$. A multiplicity of such sensors $D_1, D_2, \ldots D_n$, each with the associated clocking and sampling circuits, as shown in the block diagram of FIG. 15, make up each sensor chip. A plurality of such sensor chips are butted end-to-end in sufficient number to provide a full-width CORCIS as shown in FIG. 14. Control, sampling, reset, transfer, readout, chip-enable and drive clocks are also included for each chip to control the timing and scan advance of the circuit. The circuit for each individual sensor, as shown in FIG. 15, includes sampling and holding circuits and further includes two buffer amplifiers which scrub the signals (video output 1 and video output 2) before transmission to one or more differential combining amplifiers on the hybrid sensor board. The function of the differential amplifier is to subtract the reset or no-signal level output from each sensor from the output that includes the desired sensor signal, thus leaving only the sensor signal, free from noise and variations in reset level. There are at least three possible embodiments of the invention as shown in FIG. 10, FIG. 16, and FIG. 17 which differ in the implementation of the combining of the differential signal from each pixel. However, which of the embodiments is chosen is not pertinent to the color reproduction method of the present invention. Any of the embodiments may be used, with only minor variations.

With reference again to FIG. 10 as elements of a potential embodiment, sensing elements $D_M$ provide video output signals, via buffer M3, onto the signal sampling capacitors $C_{HA}$ by means of sampling switches M6, controlled by pulse $\phi_{SHA}$. While these signal levels are held, each sensor is reset to the reset level, here nominally +5 volts, by reset switches M5, controlled by reset pulse $\phi_R$. The reset levels are stored on capacitors $C_{HB}$. The readout switches then connect these voltage levels to video outputs 1 and 2 through the buffer amplifiers M2A and M2B, activated by the readout switches M1A and M1B controlled by the readout shift register output pulse $\phi_M$. A following differential amplifier serves to complete the differential sample and hold processing for each sensor.

To obtain the desired color reproduction, the entire sensor array is first illuminated with light limited to one of the chosen primary colors, for example, red. After the appropriate integration period, array readout and signal processing as above described is initiated. The data is then transferred, in parallel, to the holding capacitors and the final readout register. As soon as the data has been transferred to the final readout register, illumination and integration for the next color's data can begin. Actual readout of the first color's data occurs while the second color's data is being accumulated. The third color's data is acquired while the second color's data is being read out and the next line of new first-color data is acquired while the third color's set of data is being read out in a similar manner. This process repeats regularly with the three groups of color data occurring sequentially for each line of scanning.

Thus, to repeat, while the signals from one line and color are being read out, the sensors $D_M$ are accumulating charges corresponding to light values for the next color for that line. The three color outputs appear sequentially from the same output, then implementation of the scanning process for the next line proceeds.

Since the sensors are grouped with multiple chips butted end-to-end, the initiation of signal sampling, reset, and transfer to the readout registers happen simultaneously for all the sensor chips in the group. Readout is initiated by a start pulse. When the signal from the last sensor on one individual chip is read from the storage register, the controlling shift register produces an end of scan (EOS) signal for that chip which is received by the readout register on the next chip, in sequence, as a start pulse for that chip. In this manner, only one overall start pulse per line per color needs to be generated by the circuit's clock, regardless of how many sensor chips are utilized.

As suggested by its designation, the start pulse initiates the scanning operation of the shift register while the master clock and its buffer provide the sequential enabling clocks for the shift register. The chip enable circuit is used to enable and disable the power to each sensing element and also to the output amplifiers. By using the chip enable circuit to provide power to only one sensor chip at a time, the overall power consumption of the circuit can be significantly reduced.

In prior art color applications, three sets of active sensing elements were utilized; a first set including a red light filtering means, a second set including a green light filtering means, and a third set including a blue light filtering means. In such an application, the scanner's complexity was essentially tripled. In the present invention, instead of one illumination source and three detector arrays, the system comprises three illumination sources and one detector array. The three color outputs appear sequentially, rather than in parallel, but at considerably reduced complexity.

Figure 18:
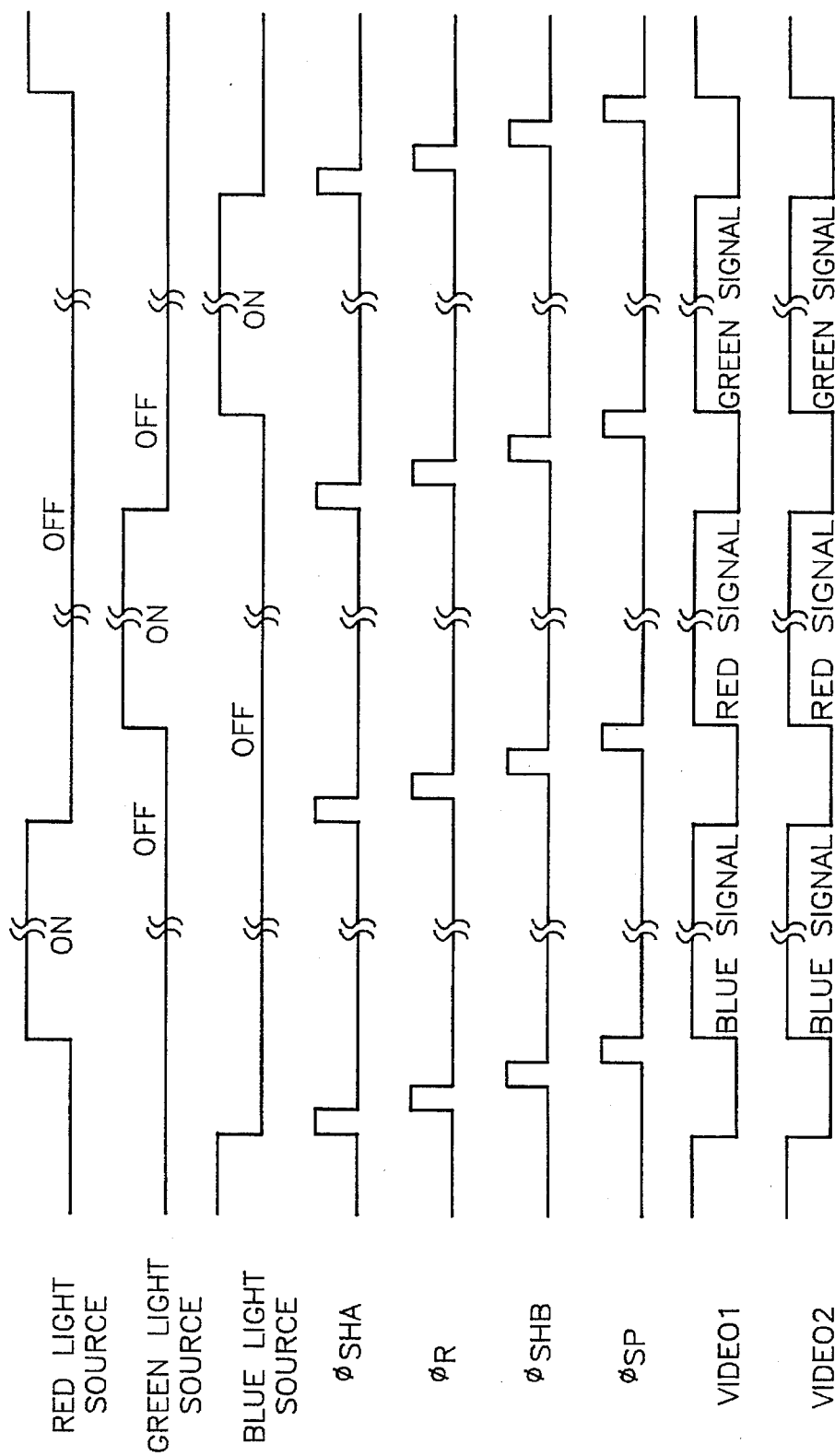
FIG. 18 shows a timing diagram and output signals for the CORCIS system, illustrating the relationship between light sources, sample pulses, reset, start pulse, and output signals.

The integration time for one color for one line is the time between two consecutive color-data transfers for each of the photodiodes. During the integration time, the signal charge generated by the incident light will accumulate at the photodiode $D_M$, lowering the photodiode voltage by an amount defined as $Q_S/C_D$, where $Q_S$ is the signal charge and $C_D$ is the capacitance of the photodiode. Since both $Q_S$ and $C_D$ are proportional to the photodiode area, the sensitivity of the photodiode detector is therefore independent of the detector area or size. This characteristic allows the use of very high density sensor chips without any sacrifice of system sensitivity. FIG. 18 shows the timing diagram and output signals of the preferred embodiment of the CORCIS system.

FIG. 16 depicts a schematic diagram of an alternate embodiment of the present invention. PG is a MOS type photodetector, VB is a bias gate, and $D_M$ is the actual sensing node. VB is biased in such a way as to allow the signal charges collected at PG to flow into the sensing node $D_M$. The bias gate VB also separates the capacitance of the $D_M$ sensing node from the capacitance of the photodetector PG. Since the sensitivity of the sensor chip is proportional to $1/C_D$, where $C_D$ is the capacitance of the sensing node, and $C_D$ can be made very small, the sensitivity of the CIS chip can be improved significantly with this type of active sensing pixel. To improve the short-wavelength (blue) response, the MOS type photodetector PG can be replaced with a pinned photodiode. This type of voltage pickoff active sensor is referred to as a charge-transfer active sensor.

FIG. 17 shows an alternate embodiment of the present invention with a charge transducer gain stage. The reset MOS transistor on FIG. 10 is replaced by a charge integrator circuit in FIG. 17. The charge integrator circuit consists of an operation amplifier (or other form of differential amplifier), integration capacitance $C_I$, MOS resistor M4, and reset transistor M3. The photodiode is reset to the reference voltage when the reset transistor M3 is turned on.

Figure 5:
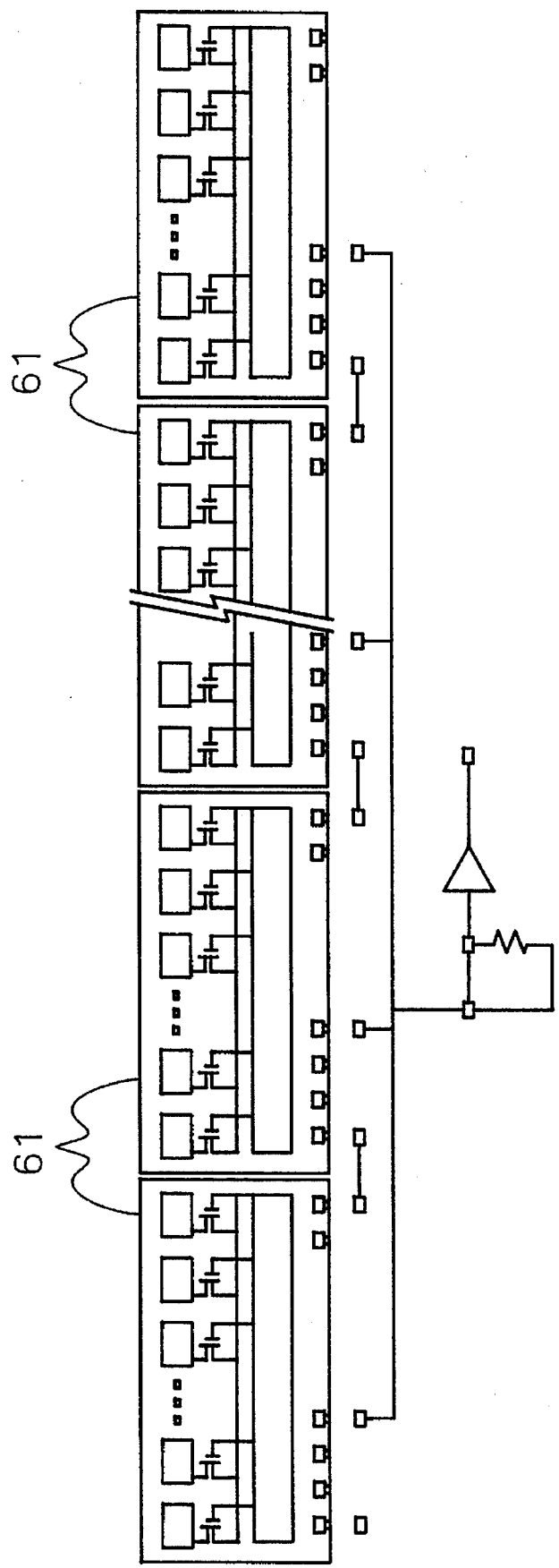
FIG. 5 is a block diagram of the hybrid sensor chip of a prior art CIS scanning device.
Figure 6:
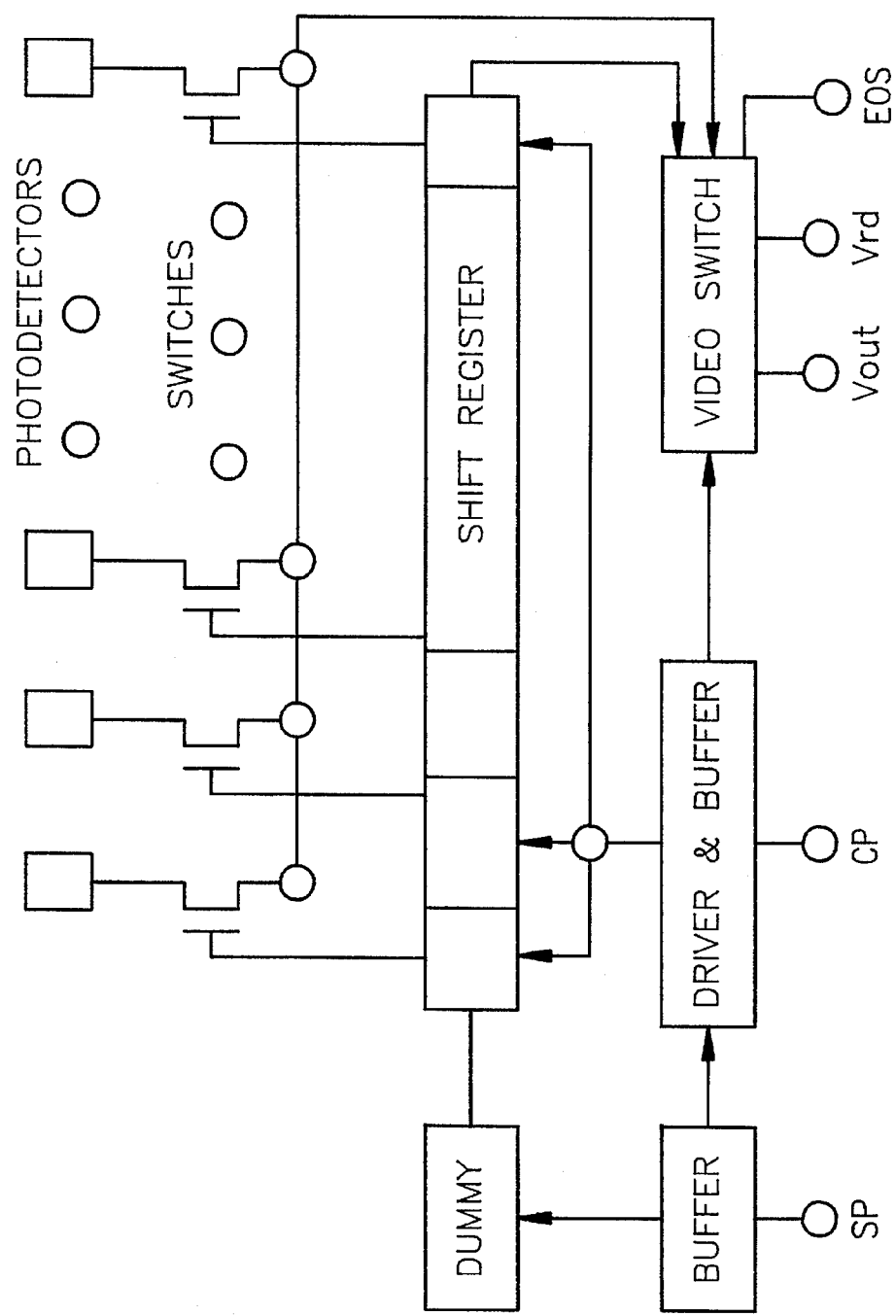
FIG. 6 is a block diagram showing the arrangements for a single chip of the array.
Figure 7:
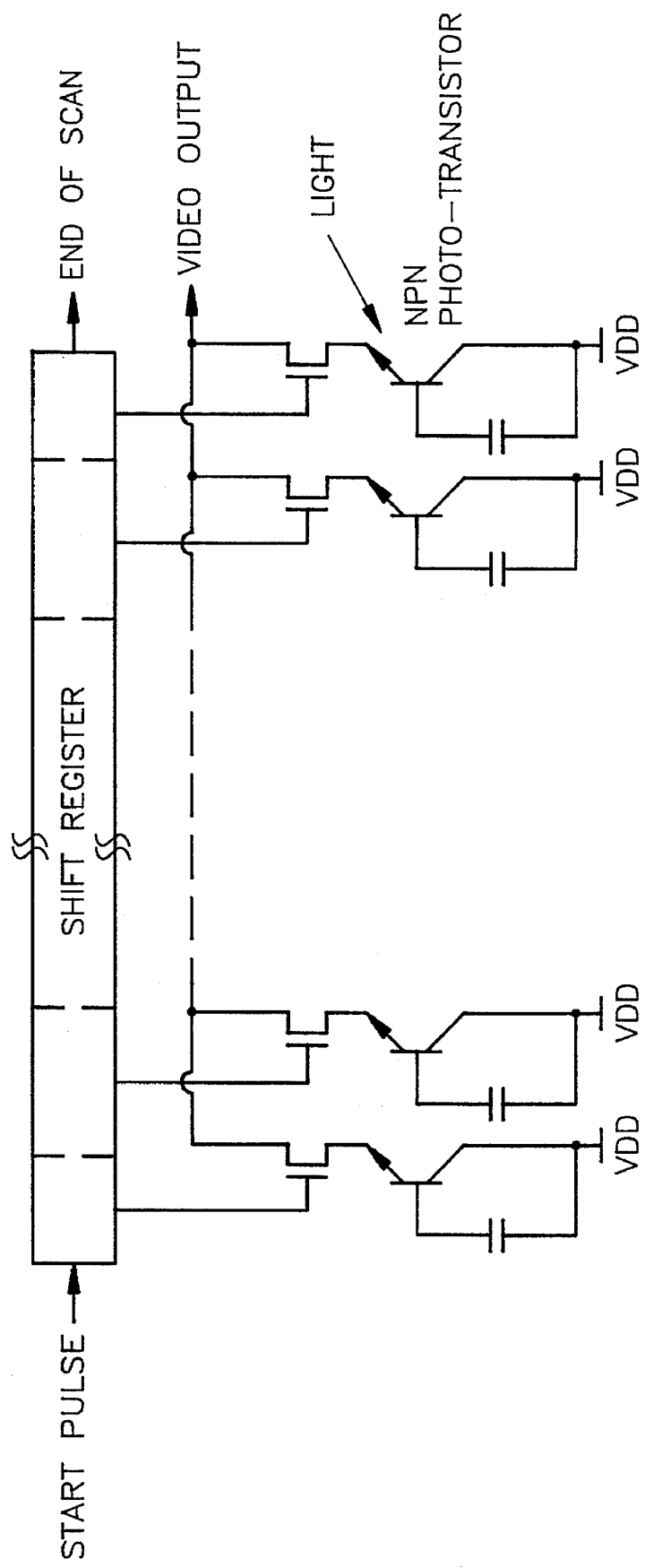
FIG. 7 shows the arrangement of npn phototransistors in a prior art array.
Figure 8:
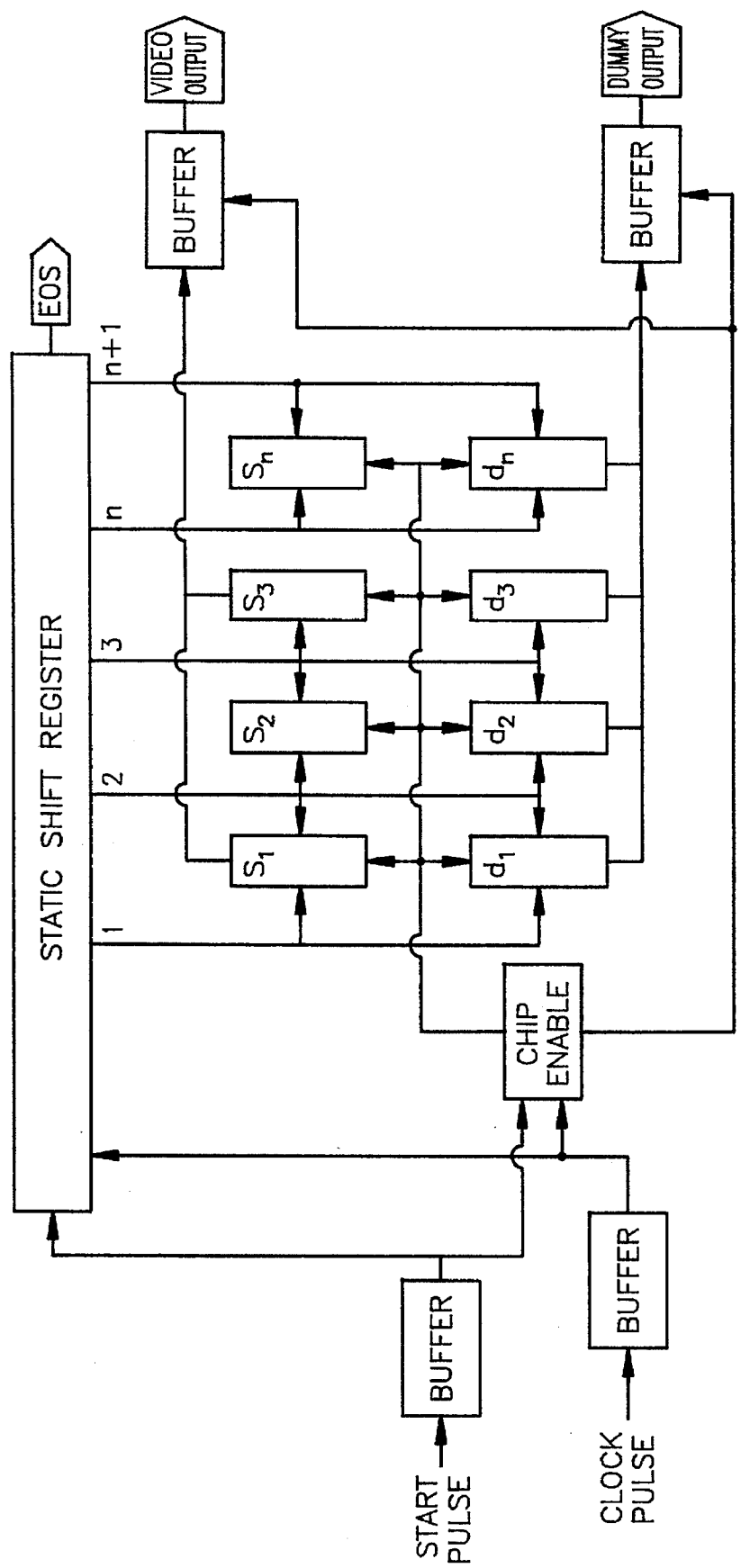
FIG. 8 shows an improved detector system with voltage pick-off and offset cancellation through subtraction of signals from dummy sensors.
Figure 9:
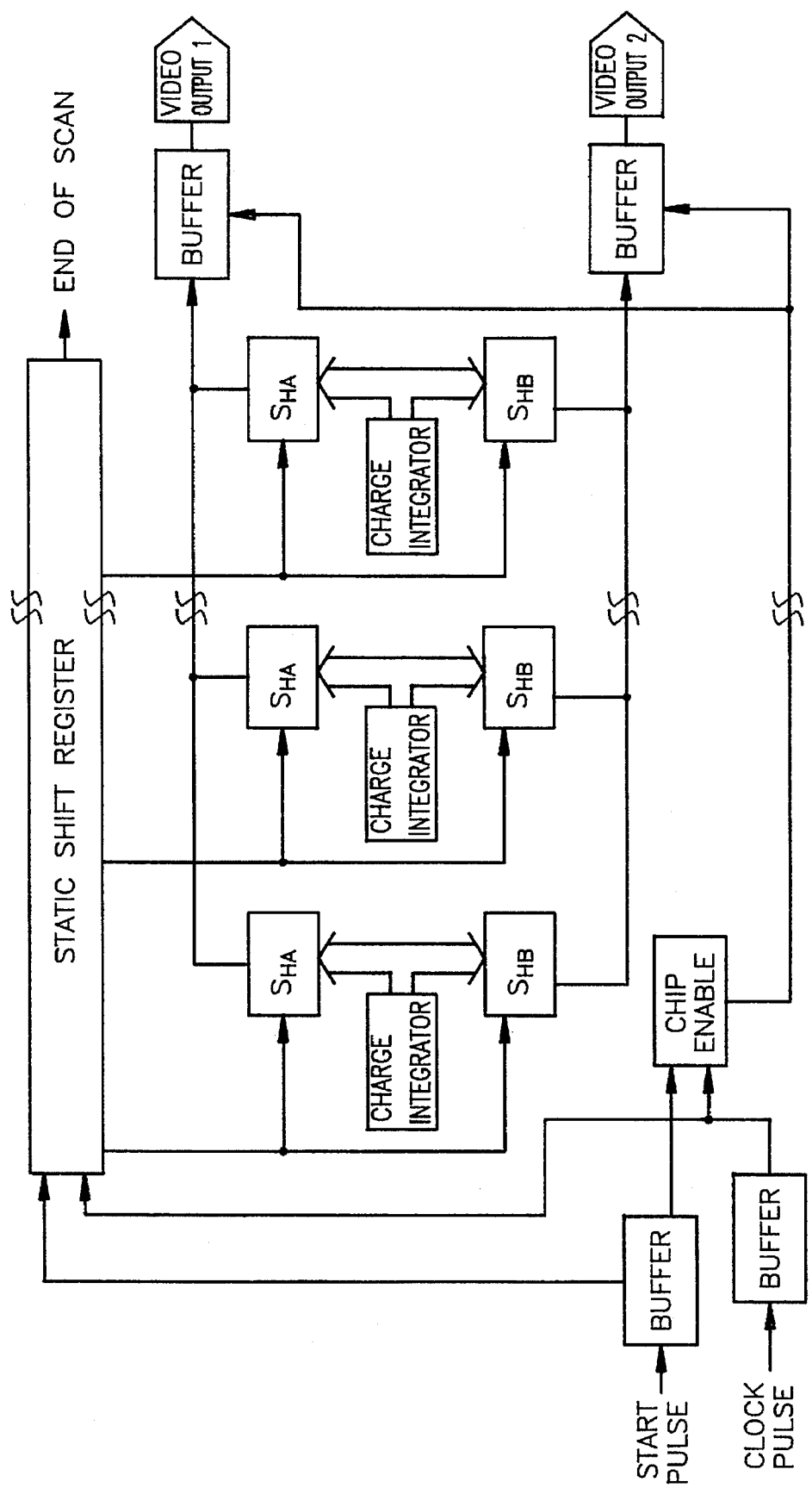
FIG. 9 shows a block diagram illustrative of correlated double sampling (CDS)

A series of individual sensor chips are butted end-to-end to make up the CORCIS array in a fashion similar to that shown in FIG. 5 for prior art designs; the individual chips, however, are of new design which include the correlated double sample and hold signal processors as well as the parallel transfer gates and readout registers indicated before. The number of photodetectors per chip and their center-to-center spacing are determined by the resolution required. For example, 200 dpi, 300 dpi, and 400 dpi resolutions respectively require 64, 96, and 128 photodetectors on an 8-mm long CIS sensor chip. The chips require pixel center-to-center spacing of 125 µm, 83.3 µm, and 62.5 µm for 200 dpi, 300 dpi, and 400 dpi resolutions respectively. The number of chips required is a function of the width of the scanning field desired (size of the document to be scanned).

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

We claim:

1. A color-reproducing contact image sensor circuit comprising:

a plurality of sensing elements, each including a first sample and hold circuit and a second sample and hold circuit, a colored-light source, said light source generating in sequence a first illumination cycle utilizing a first primary color, a second illumination cycle utilizing a second primary color, and a third illumination cycle utilizing a third primary color, control and drive clocks to control the timing and scan advance of the circuit, a digital scanning shift register, a first buffer amplifier and a second buffer amplifier; wherein said sensing elements are activated in parallel by an initiation pulse, each said sensing element thereby generating a first output signal responsive to said first illumination cycle that is received in said first sample and hold circuit from whence it is transmitted to said first buffer amplifier and is output as a first video signal, said sensing element thereafter being reset to a dark level and generating a second output signal corresponding to said dark level, said second output signal being received in said second sample and hold circuit from whence it is transmitted to said second buffer amplifier and is output as a second video signal, after which said scanning shift register is initiated by a start pulse to begin a readout of said first and said second video signals in sequence, with a differential amplifier subtracting said second video signal from said first video signal, thereby yielding a first resultant video signal representing data from said first primary color of a scanned line of a subject image, and simultaneously with said readout of said first and said second video signals, said sensing elements collect light from said second illumination cycle, and following said readout of said first and said second video signals, said sensing elements are activated in parallel by a second initiation pulse to generate a third output signal and a fourth output signal responsive to said second illumination cycle, said third and said fourth output signals being processed in the same manner as said first and said second output signals so as to generate a second resultant video signal representing data from said second primary color of a scanned line of a subject image, and simultaneously with said readout of said third and said fourth video signals, said sensing elements collect light from said third illumination cycle, and following said readout of said third and said fourth video signals, said sensing elements are activated in parallel by a third initiation pulse to generate a fifth output signal and a sixth output signal responsive to said third illumination cycle, said fifth and said sixth output signals being processed in the same manner as said first and said second output signals so as to generate a third resultant video signal representing data from said third image, and said first, second, and third resultant video signals are transferred to a storage readout register and read out as a color reproduction of said scanned line of said subject image.

2. The circuit of claim 1 wherein:

said colored-light source comprises light emitting diodes.

3. The circuit of claim 1 wherein:

said colored-light source comprises a white light source divided by a prism means into three spectral portions each comprising a primary color.

4. The circuit of claim 1 wherein:

said circuit further comprises a bias gate, said bias gate allowing signal charges to flow into a sensing node, said bias gate further separates a capacitance of said sensing node from the capacitance of said sensing elements, thereby improving sensitivity of said circuit.

5. The circuit of claim 4 wherein:

said colored-light source comprises light emitting diodes.

6. The circuit of claim 4 wherein:

said colored-light source comprises a white light source divided by a prism means into three spectral portions each comprising a primary color.

7. The circuit of claim 1 wherein:

said sensing elements comprise a pinned photodiode.

8. The circuit of claim 7 wherein:

said colored-light source comprises light emitting diodes.

9. The circuit of claim 7 wherein:

said colored-light source comprises a white light source divided by a prism means into three spectral portions each comprising a primary color.

* * * * *